United States Patent
Benedict

[15] 3,661,007
[45] May 9, 1972

[54] CAM FEEDER AND DIE

[72] Inventor: Frank R. Benedict, Brightwaters, N.Y.

[73] Assignee: The Trane Company, La Crosse, Wis.

[22] Filed: Dec. 11, 1969

[21] Appl. No.: 884,238

[52] U.S. Cl. ................................................72/421, 83/226
[51] Int. Cl. .........................................B21d 43/02, B26d 5/20
[58] Field of Search ...................72/421, 427, 361; 83/226; 113/113

[56] References Cited

UNITED STATES PATENTS 3,470,726  10/1969  Richter ..................................72/361
2,321,788  6/1943  Anderson ..............................83/226
3,030,834  4/1962  Anderson ..............................72/427

Primary Examiner—Charles W. Lanham
Assistant Examiner—Robert M. Rogers
Attorney—Irving Seidman

[57] ABSTRACT

In a feeder die system, a gag system is provided which is adapted to simultaneously operate a plurality of actuators permitting reciptocating movement of feeder bar of a die. Provision is further made for utilizing the actuating force of the actuator cam for general die applications.

4 Claims, 15 Drawing Figures

INVENTOR.
Frank R. Benedict
BY Irving Seidman
ATTORNEY

INVENTOR.
Frank R. Benedict
BY Irving Seidman
ATTORNEY

INVENTOR.
Frank R. Benedict

BY Irving Seidman

ATTORNEY

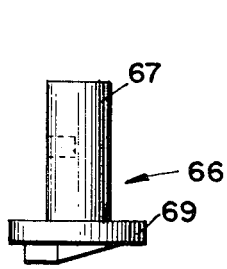
FIG.6
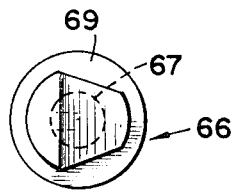
FIG.7
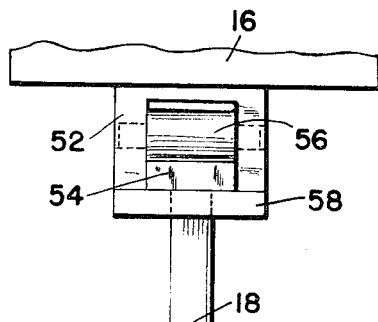
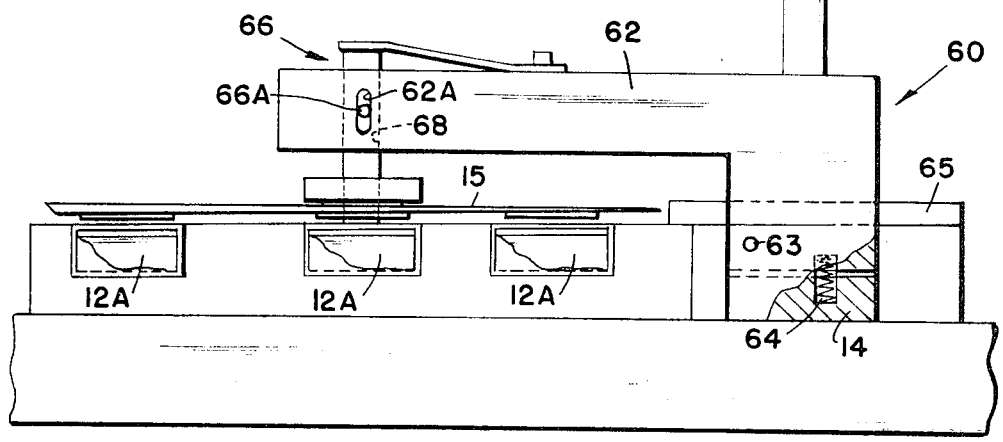
FIG.5
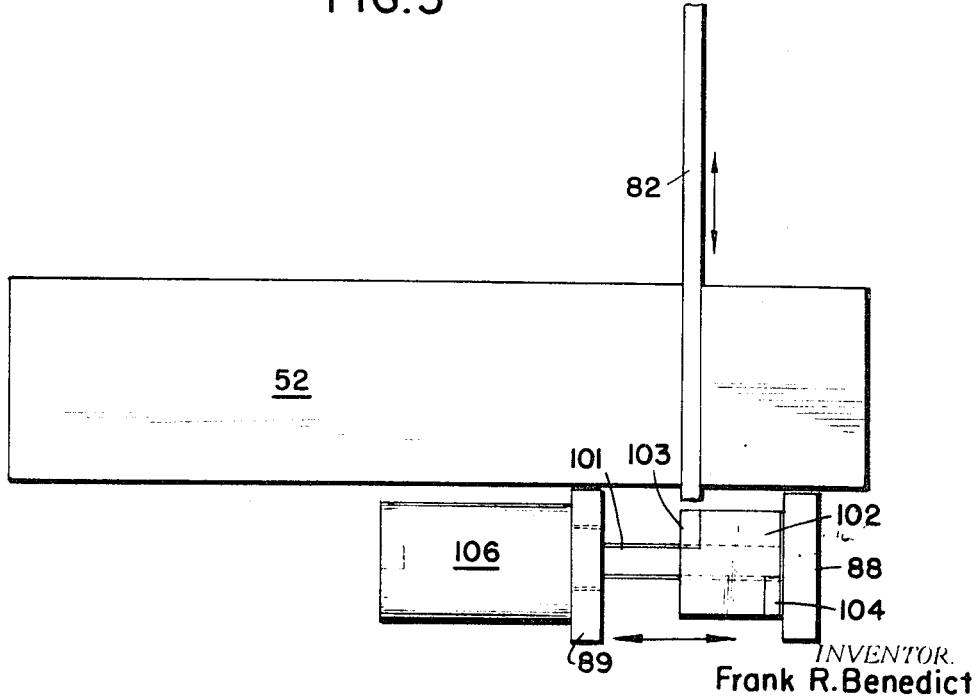
FIG.13

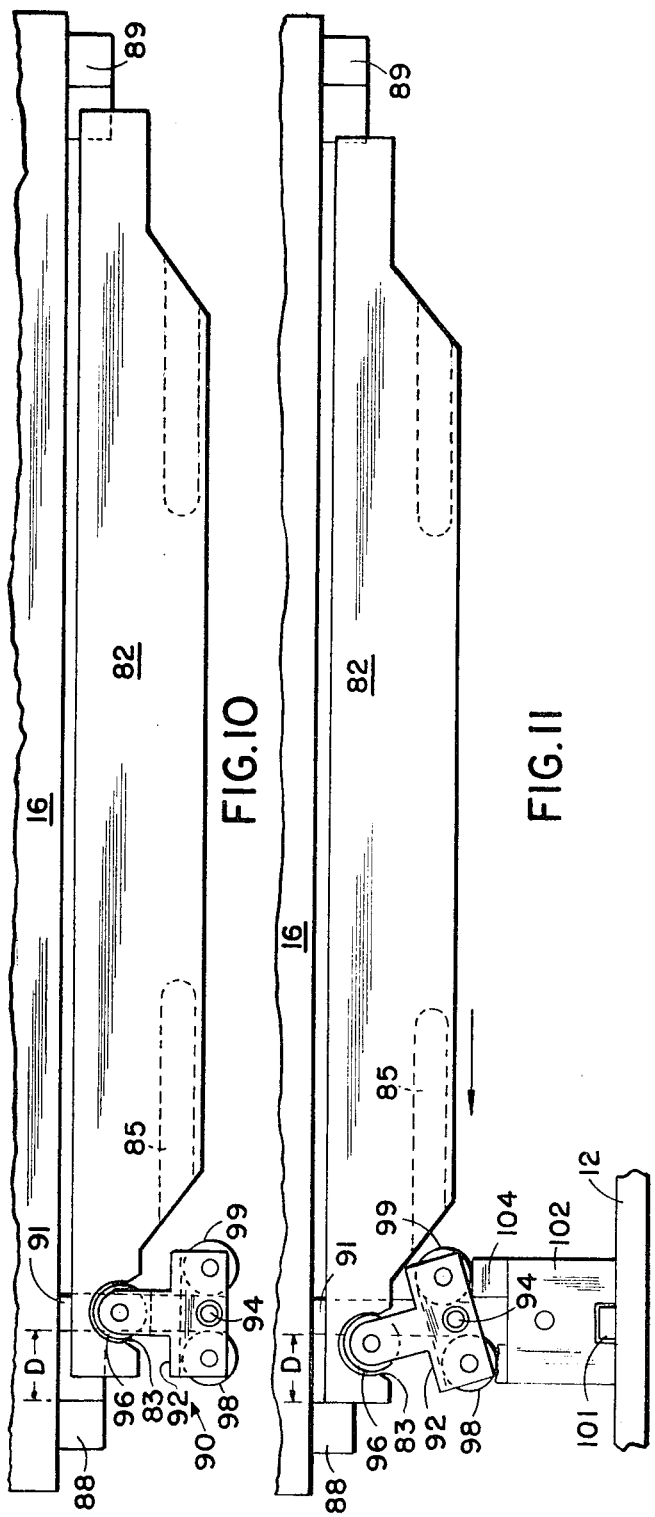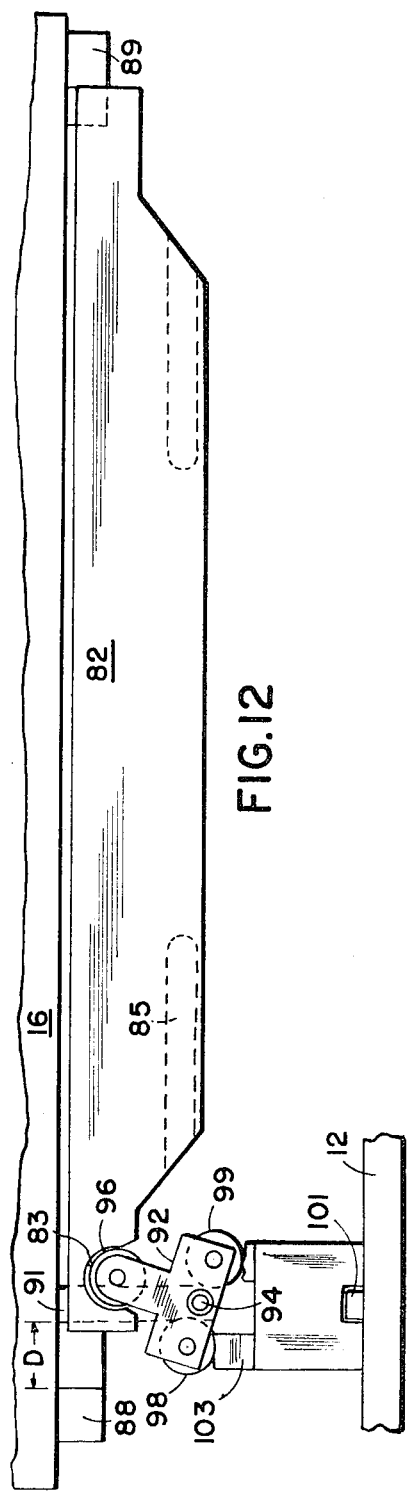

CAM FEEDER AND DIE

In the manufacture of uniformly dimensioned collared openings, a thin sheet of metallic material is fed through a press equipped with a die for forming openings thereupon. The sheets of metal having such collared openings thereupon are subsequently slit to form fins for use in radiating surfaces in heat units, air conditioning equipment or the like. In feeding the sheet material through a progressive die having a series of stations, an opening formed at a first die station, and shaped at a second die station, provision must be made for precisely advancing the material from die station to die station between forming operations.

In U.S. Pat. No. 3,470,726, a long feed cam feeder with a skip move for use in a feeder die system has been set forth in which the gag plates were individually operated on each cam by separate air cylinders to produce the skip move. As will be evident from the foregoing disclosure, synchronization of the cylinders is essential to produce gag or ungag on both cams simultaneously. Although the operation of a system as therein described is extremely efficient, the operation thereof at extremely high speeds, as for example above 400 strokes per minute, indicated the possibility of failure to attain exact synchronization of the cylinders to produce gag or ungag on both cams simultaneously would seriously damage the cam and/or feeder drive bar.

It is therefore an object of the present invention to provide in a feeder die system a single actuating system for introducing or removing gags upon more than one cam simultaneously.

Another object herein is to provide positive operation of more than one gag plate simultaneously so as to eliminate the possibility of having a gag-in on one cam and a gag-out on a second cam.

Another object of this invention is the provision of a long feed cam feeder which is relatively quiet and shock free especially at high operating speeds.

A further object of the present invention is the provision of a feeder die system having positive synchronization whereby a gag is either in or out on more than one cam.

In addition to utilization of the cams as parts of a feeder system, the cam feed system can be effectively employed for general die applications. Actuating force on a cam follower which usually carries the working tool, is derived from the ram and high forces are available over a usually small follower travel. Total follower travel is limited by the cam angle that may be used without friction lock-up. Utilizing the long feed cam system with a full floating double cam combined with a low friction cam follower system provides large follower movement coupled with high force transfer to the follower system. There are many die applications where it is desirable to pass a large part directly through a die, performing work on the part as it is manually or automatically indexed through the die. Quite often the work to be done by the die is far inside the press, requiring long travel of the die to the work area on the part coupled with the high die force at the work area. The use of the long feed cams, as will be evident from the foregoing description, can effectively be employed as a die system.

Other important objects, advantages and features of the present invention will be apparent to those versed in the art from the following description and accompanying drawings wherein like reference characters designate like or corresponding parts in the several views and wherein:

FIG. 5 is an end view of the cam feeder shown in FIG. 1;

FIG. 6 is a side elevation of a feed finger;

FIG. 7 is a bottom view of the feed finger as shown in FIG. 6;

FIG. 10 is an elevational view of the cross rail shown in FIG. 9 and showing the rocker arm in mid position;

FIG. 11 is an elevation of the cross rail shown in FIG. 10 showing the rocker arm tipped for out-gag, moving the cross rail to the left against the stop block;

FIG. 12 is an elevation of the cross rail shown in FIG. 10 showing the rocker arm tipped for in-gag, moving the cross rail to the right against the stop block;

FIG. 13 is a top plan view showing the positioning of the operating block and the gag-in and gag-out positions thereof;

Figure 1:
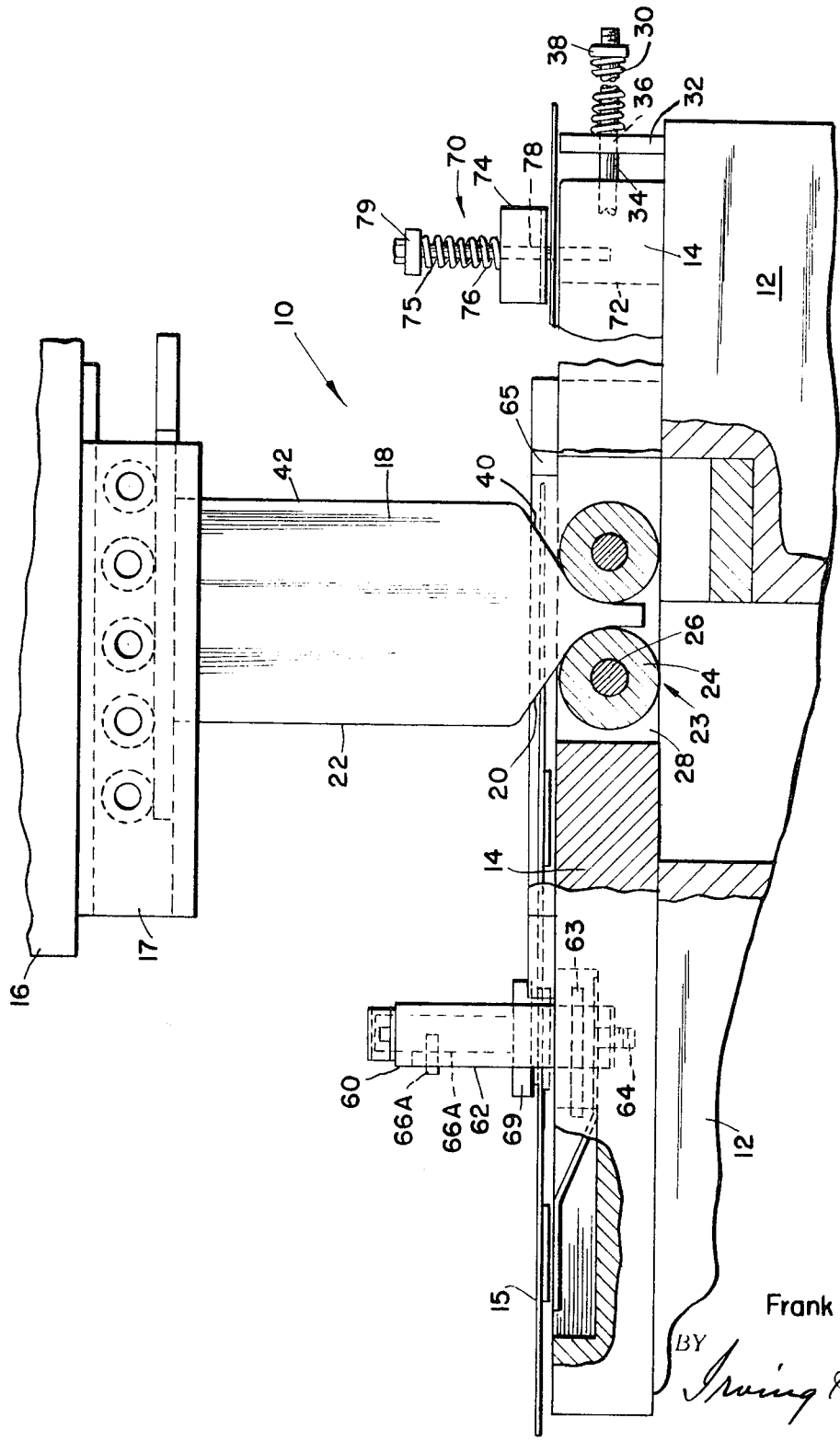
FIG. 1 is a fragmentary side elevation of a cam feeder having some parts thereof shown in section.

Referring now to the drawings, there is shown in FIG. 1 a die set 10 adapted to be associated with a press (not shown). The die set 10 generally includes a fixed lower die plate 12 mounted on the press to act as a platform for a feeder bar 14 which is endwise horizontally reciprocable for moving the workpiece 15 in the desired direction of travel, and an upper die plate 16 connected to the ram of a press by means of a bracing bar 17 to act as a support for a feeder bar actuator 18 carried by the upper plate vertically toward and away from the lower plate.

The vertical motion of actuator 18 is translated to horizontal feeder bar motion through the combination of a cam face 20 formed in the forward surface 22 of actuator 18, and a cam follower 23 carried by feeder bar, said cam follower being a roller 24 mounted on a shaft 26 extending from the feeder bar across a slot 28 formed in the feeder bar to receive actuator 18. As actuator 18 is moved into slot 28 cam face 20 turns roller 24 on shaft 26 to move feeder bar 14 forward. Roller 24 is spring loaded toward the rear end against the forward surface 22 of actuator 18 by a spring 30 which is compressed against a fixedly mounted stopping element 32 as the feeder bar is moved forwardly by the actuator. The rear end of the feeder bar is connected to the spring 30 by way of a rod 34 extending from the feeder bar through an opening 36 in element 32 and axially of the spring 30 to a spring adjustment collar 38 which caps the end of spring remote from stop 32 and is threadably connected to rod 34. In operation, as the actuator 18 is moved upwardly out of slot 28, the roller 24, now turning in the opposite direction on shaft 26, tracks cam face 20 as feeder bar is rearwardly returned by expanding spring 30.

Figure 2:
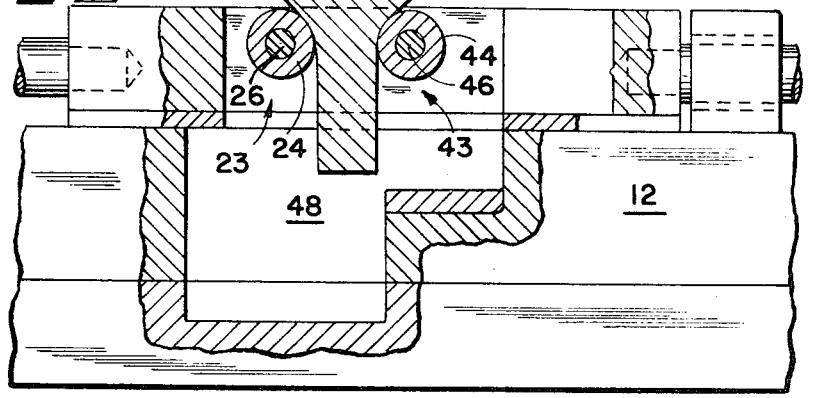
FIG. 2 is a fragmentary side elevation of another cam feeder with some parts thereof shown in section.
Figure 8:
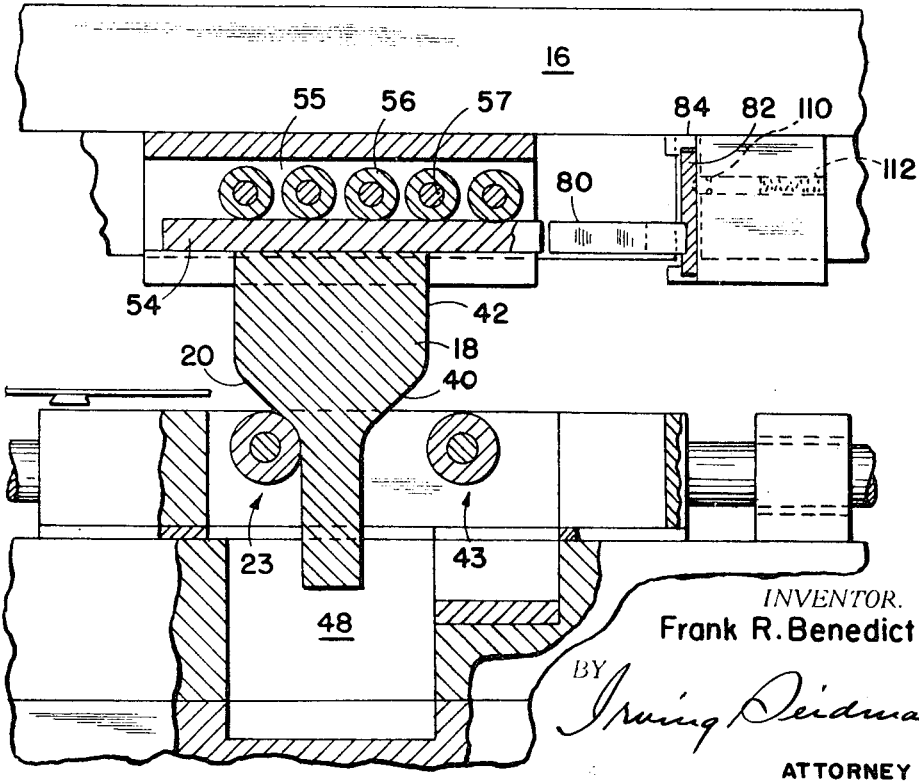
FIG. 8 is a fragmentary side elevation of the cam feeder shown in FIGS. 2 and 4 with the gag out.

It will be obvious that with the foregoing arrangement the feeder bar roller shaft 26 is subjected to the most stress when the angle of the cam face 20 subtends with respect to the depth of the actuator is least, the depth of the actuator being the maximum distance between the rearward and forward surfaces 42, 22 of the actuator as measured along a line drawn parallel to the direction of the motion of the feeder bar. As shown in FIG. 2, in order to reduce the mechanical stress on the feeder bar roller shaft 26, the feeder bar actuator 18 is connected to the upper die plate 16 for horizontal reciprocation, forming an additional cam face 40 on the rear surface 42 of actuator 18 and adding a cam follower 43 on the fixed lower die plate 12 with which the rearward cam face 40 cooperates to horizontally reciprocate the actuator.

For the purpose of the following discussion it is assumed that the depth of the actuator has been predetermined. Ordinarily, the maximum depth of the actuator is limited by the length of stroke of the press to which the die set is adapted.

Figure 3:
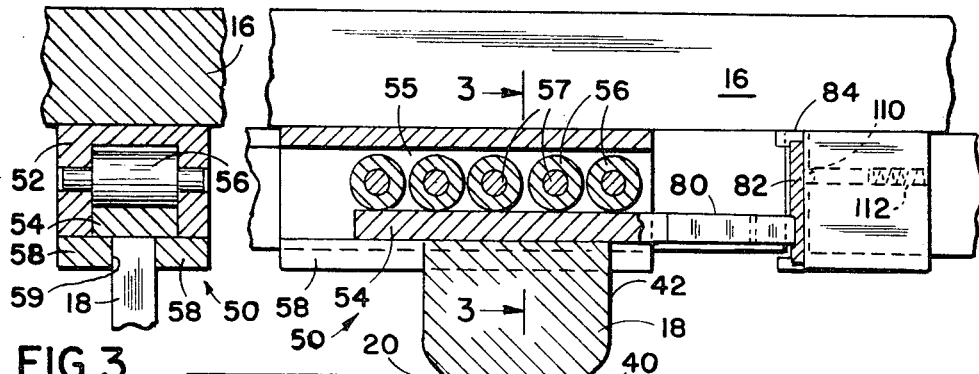
FIG. 3 is a partial end view taken on line 3—3 of FIG. 2.

As best shown in FIGS. 2 and 3, the actuator 18 is reciprocably carried beneath the upper die plate 16 by means of a sliding bearing type of interconnection 50 between them, the fixed portion 52 of the interconnection being associated with the upper die plate 16 and the movable portion 54 being associated with the actuator 18. The fixed and movable portions 52, 54, respectively comprise an open-ended elongated channel member of inverted U-shaped cross-section connected to the upper die plate to define a passageway 55 parallel to the direction of travel of the feeder bar, and an elongated slide bar connected to the upper end of the actuator 18. The slide bar 54 is endwise slidable in the passageway 55 for carrying the actuator in the direction of travel of the feeder bar. A plurality of thrust rollers 56 located within the passageway and in rolling contact with the upper surface of the slide bar 54 are mounted on shafts 57 extending across the passageway from the side walls of the channel 52. The lower end of the channel 52 is formed by a pair of elongated substantially parallel plates 58 extending laterally from the side walls of the channel to form an elongated lower opening 59 into the passageway 55. The plates 58 act as rails or guideways upon which the slide bar 54 is lengthwise seated. As the slide bar moves, its lower surface is held in sliding with the guide plates 58 by the thrust rollers 56, the rollers turning in one direction or the other depending on the direction of motion of the slide bar. Since the actuator extends downwardly from the lower surface of the slide bar and through the passageway opening 59 it is guided for motion in the direction of travel of the feeder bar by the plate 58.

The rear cam face 40 is formed in the rearward surface 42 of the actuator 18 to cooperate with the cam follower 43 associated with the fixed lower die plate 12. The cam follower 43 preferably comprises a roller 44 mounted on a shaft 46 extending from the fixed lower die plate 12 across a slot 48 formed in the lower die plate 12 to receive the actuator 18. The lower die plate roller 44 is rotated in place on the shaft 46 by the actuator as it moves upwardly and downwardly in the slot 48, the rearward cam face 40 coacting with the roller 44 to horizontally move the actuator.

Figure 4:
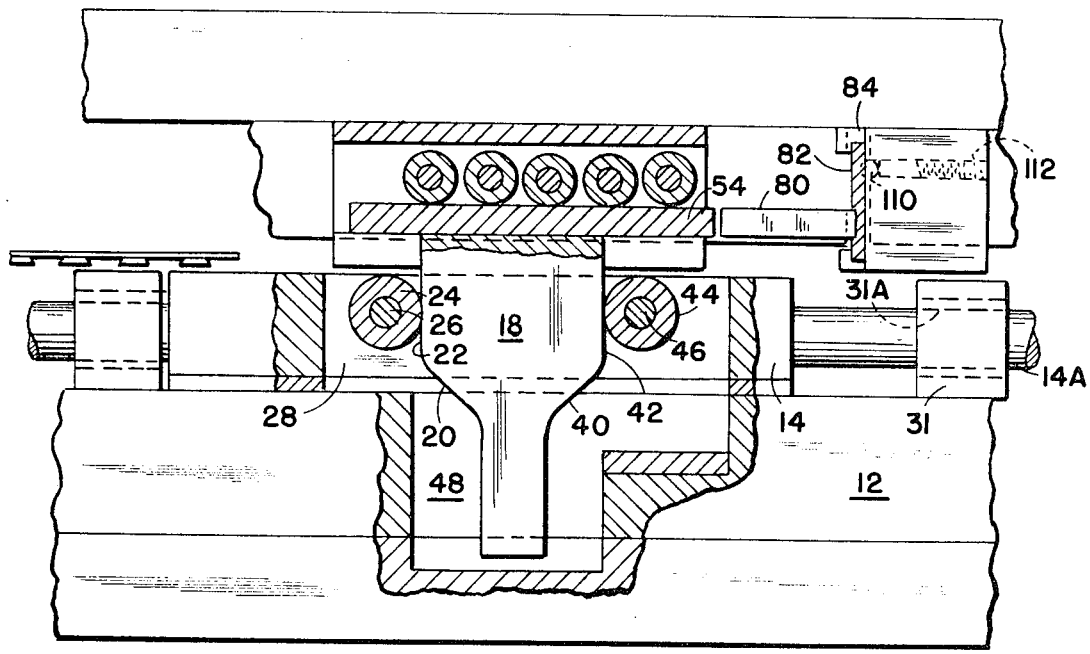
FIG. 4 is a fragmentary side elevation of the cam feeder shown in FIG. 2 with the feeder bar actuator moved downwardly.
Figure 9:
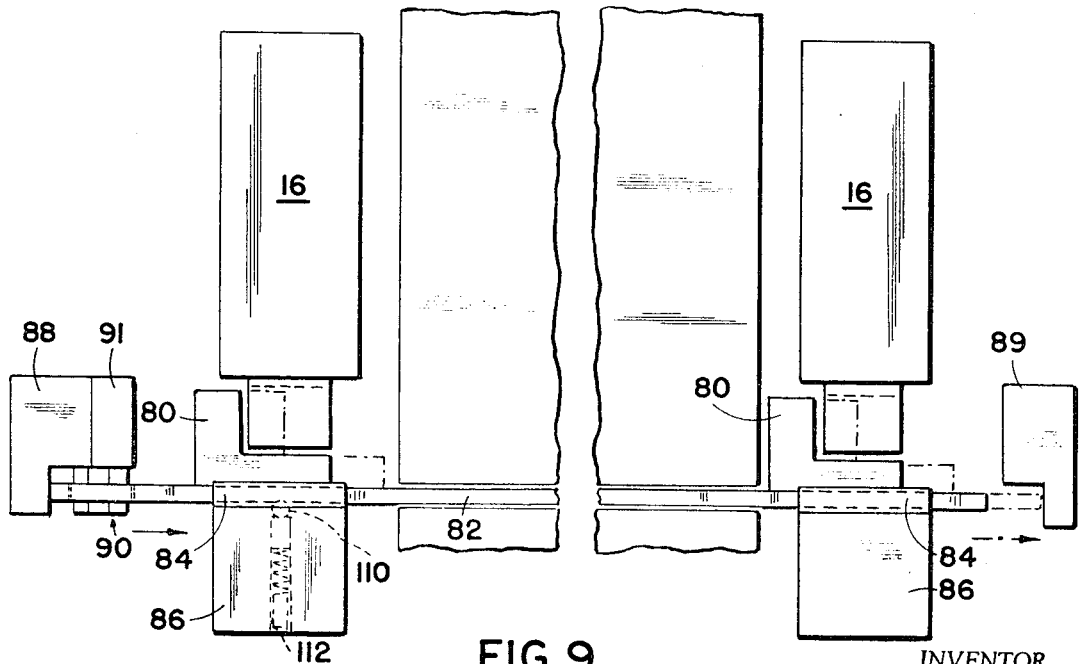
FIG. 9 is a top plan view of the upper parts of the cam feeder with the top die shown removed.

In operation, as the actuator moves downwardly into the lower die plate slot 48 the rearward cam face 40 turns the lower die plate roller 44 on its shaft 46 for forwardly moving the actuator 18. Since the actuator is in contact with the feeder bar roller 24, as the actuator moves forwardly the feeder bar is moved forwardly. FIG. 4 shows the actuator 18 fully moved downwardly. As hereinbefore described in connection with FIG. 1, the feeder bar roller 24 is spring loaded towards the rear against the forward surface 22 of the actuator by the spring 30. Consequently, the rearward surface 42 of the actuator is urged towards the rear against the lower die plate roller 44. As the actuator moves upwardly out of the lower die plate slot 48, the feeder bar is rearwardly returned by the expanding spring 30. The rearwardly moving feeder bar carries the actuator rearwardly. Thereupon the actuator causes the die plate roller 44 to turn in the opposite direction on its shaft 46 and track the rearward cam face 40. While there operations are in progress the feeder bar causes the feeder bar roller 24 to track the forward cam face 20 as hereinbefore described to further return the feeder bar.

The arrangement allows the angle the forward cam face 20 subtends with respect to the depth of the actuator to be increased to relieve stress on the feeder bar roller shaft 26, the feeder bar motion lost thereby being made up for by the addition of the rearward cam face 40 and the stress being absorbed by the die plate roller shaft 46. Additionally, it should be appreciated that the depth of the actuator may be increased for correspondingly increasing the distance the workpiece is advanced, and the forward and rearward cam faces of the actuator may be vertically spaced apart from one another when they are formed in the actuator surfaces to move the feeder bar in two distinct sequential steps rather than in a single continuous step. The arrangement thus lends itself to more complex forming operations at the option of the user.

With the improved arrangement, the feeder bar is fully advanced forwardly as the ram of the press moves downwardly and fully returned rearwardly as the ram moves upwardly. As shown in FIG. 4, the forward cam face 20 coacts with the forward cam follower 23 to advance the feeder bar "X" inches and the rearward cam face 40 coacts with the rearward cam follower 43 to advance the feeder bar an additional "X" inches; a total advancement of 2X inches during the downward stroke of the ram. The spring 30 described in connection with FIG. 1 returns the feeder bar 2X inches during the upward stroke. As shown in FIGS. 1 and 5, to transmit forward feeder bar motion to the workpiece 15, a material carrier 60 is connected to the forward end of the feeder bar for engaging the workpiece. The carrier 60 repeatedly engages the workpiece to advance the workpiece the same distance the feeder bar is forwardly moved, and disengages the workpiece when the feeder bar is rearwardly moved.

As best shown in FIG. 5, the carrier 60 basically includes an arm 62 connected to the forward end of the feeder bar 14 such that the arm overhangs the workpiece 15. The overhanging portion of the arm 62 is equipped with a feed finger 66 which repeatedly engages the workpiece to move the same when the feeder bar moves forwardly and repeatedly disengages the workpiece when the feeder bar moves rearwardly.

In the embodiment shown in FIG. 5, the arm 62 is preferably pivoted to the feeder bar by means of a pivot pin 63 having one end anchored to the arm 62 or the feeder bar 14, and the other end rotatably mounted in the member 62 or 14 to which it is not anchored. A spring 64 is mounted at the feeder bar end 61 of the arm for urging the feed finger end of the arm towards the workpiece. As shown in FIGS. 5, 6 and 7, the feed finger 66 preferably comprises an elongated body portion 67 terminated by a shaped lower end portion 69. The body portion 67 is resiliently mounted for endwise motion in a bore 68 formed in the overhanging portion of the arm 62 from the side of the arm next adjacent the workpiece, and the lower end portion 69 is shaped to fit a part of the workpiece formed by the die set; in this case, on opening formed in the workpiece at a previous die station. In operation the lower end portion 69 repeatedly engages the rim of opening to forwardly pull the workpiece when the feeder bar moves forwardly, and repeatedly cams itself out of the opening thereby disengaging the workpiece when the feeder bar moves rearwardly. The feed finger 66 is contrained to prevent its rotation in place by a pin 66A which laterally extends from the upper end portion and rides in a slot 62A formed in the arm 62. Further, a spring 12A, or plurality of springs 12A, may be mounted on the fixed lower die plate beneath the workpiece to urge the workpiece upwardly towards the feed finger, insuring proper engagement and disengagement therebetween.

In another embodiment, the arm 62 may extend between the forward ends of a pair of feeder bars sidewise spaced apart from one another and operated in unison with one another by similarly spaced feeder bar actuators. In this case it is desirable to fixedly mount the arm on the forward end of each of the feeder bars and eliminate the pivot arrangement hereinbefore described. As further described in the U.S. Pat. No. 3,470,726 and in U.S. Pat. No. 3,417,596, it may be desirable to add actuator extensions to the forward and/or rearward surfaces of the feeder bar actuator or shims intermediate the end of the feeder bar 14 and the arm 62 to provide for a feed finger drop-in distance of say fifty thousandths of an inch, the drop-in distance being in excess of the distance the workpiece is moved. Still further, the depth of the forward cam face may be increased by use of shims to form a drop-in distance as an alternative to using shims at the end of the feeder bar. In any event, the feeder bar is not moved forwardly the drop-in distance. This distance is soly provided to allow the lower end portion of the feed finger to overrun the workpiece a distance slightly in excess of 2X inches as the feeder bar actuator moves rearwardly so that the feed finger drops into the opening in the workpiece. In practice, the feeder bar is forwardly moved the drop-in distance before the lower end portion of the feed finger contacts the rim of the opening to carry the workpiece forwardly. It is understood, of course, that the workpiece is automatically formed by the dies after being moved, the dies being provided with means well known in the art for drawing and/or piercing operations.

In any of the embodiments of the invention it may be desirable to provide a material brake 70 at the rearward end of the die set 10 as shown in FIG. 1 for exerting a holding force on the workpiece to partially resist the pulling force of the feeder bar finger 66, thus insuring accurate displacement of the workpiece from die station to die station. The brake 70 comprises a lower member 72 fixedly mounted on the lower die plate 12 or a stationary part of the press, and an upper member 74 movably connected to the lower member by a spring 75 and guide member 76 arrangement which spring loads the upper member 74 downwardly towards the lower member 72. The guide member 76 is mounted on the lower member 72 and extends upwardly from the lower member through an opening 78 in the upper member 74 and then axially of the spring 75 to a spring adjustment collar 79. The spring adjustment collar 79 caps the end of the spring remote from the collar 79 and is threadably connected to the guide member 76. Since the work-piece is fed between the lower and upper brake members 72, 74, they respectively contact the lower and upper surfaces of the workpiece and exert a holding force on the workpiece which may be increased or decreased by manipulating the brake adjustment collar 79.

In any of the embodiments herein described, or referred to, the length of stroke of a particular press may be somewhat reduced when a die set is adapted to the press since the die set may take up sufficient space in the line of travel of the ram to forshorten the available length of stroke. For example, in mounting the die set on a press the feeder bar extends above a horizontal plan described by the uppermost surface of the lower die plate and is positioned below the ram of the press. If the portion of the press upon which the lower die plate is mounted cannot be droped to allow the entire length of stroke of the ram to be utilized, the vertically extending dimension of the feeder bar will foreshorten the length of stroke. In order to mount the feeder bar beneath the ram of the press without still further reducing the available length of stroke as would occur if the plate 65 shown in FIGS. 1 and 5 were utilized to incase the upper surface of the feeder bar, it is a feature herein to provide a feeder bar mounting arrangement which does not itself interfere with the length of stroke of the press. In any of the embodiments herein described it may thus be desirable to eliminate the encasement plate 65 and provide a pair of pillow blocks 31 in lieu thereof as shown in FIG. 4. The pillow blocks 31 are spaced apart from one another and mounted on the lower die plate to support the ends of the feeder bar. In this arrangement the end portions 14A of the feeder bar forwardly and rearwardly of the slot 28 are of reduced cross-section as compared to the portion of the feeder bar in the vicinity of the slot, and each of the pillow blocks 31 is bored to receive one of the ends of the feeder bar to act as a guide therefor. With this arrangement the feeder bar is both supported by the pillow blocks and is endwise slidable therein. The pillow blocks may be provided with bearings 31A to minimize sliding friction without departing from the spirit and scope of the invention. It should be appreciated that the vertically extending dimension of the pillow blocks may be made the same or less than that of the feeder bar to avoid foreshortening the available lengths of stroke of the ram. The material carrier, break and spring return means may be connected as hereinbefore described, or referred to, to the end portions 14A of the feeder bar.

In any of the embodiments herein described, or referred to, it is to be noted that the depth of the rearward cam face (X inches) may be increased or decreased with respect to the depth of the forward cam face (X inches), without departing from the spirit and scope of the invention. The distances are shown and described as being equal to one another to illustrate the inventive subject matter and not for the purpose of limiting the same.

With the arrangements hereinbefore described a plurality of collared openings may for example be sequentially formed in sheet material at intervals between successive 2X inch advancements of the material to form radiating fins for home heating units. The collared openings may be spaced apart from one another either 2X inches or a fraction of the 2X inch distance if more than one is to be formed simultaneously, but in any event the spaces between adjacent collared openings along the longitudinal length of the material would be the same. A combination of X and 2X inch advancements is not possible with the arrangement described. However, it is another feature of the invention to allow for such a contingency by providing means for selectively arresting the forward and/or rearward motion of the actuator. It should be appreciated that if the actuator is immobilized the rearward cam face and lower die plate roller will no longer coact with one another. Another feature of the invention is to provide a gag system which is adapted to operate more than one die plate by a single actuator.

As illustrated in FIGS. 9 through 12, L-shaped gag plates 80 are secured to a horizontally movable cross rail 82 which is carried across the upper die plates 16. Cross rail 82 is caged in a cross rail cage 84 attached to support blade 86. Stops 88 are secured to the upper die plates to limit horizontal movement of cross rail 82 in either direction. In the out-gag position as illustrated in FIG. 11, the crossrail 82 is disposed against the left stop 88, whereas in the in-gag position, the cross rail is against the right stop 89, total travel of said gag plates being the distance D.

An operating rocker arm assembly 90 is pivotally mounted at each end of cross rail 82 on supports 91, said supports secured to end stops 88, 89 which in turn are attached to the upper die plate 16, said rocker arm assembly 90 is comprised of a rocker arm 92 pivotally mounted on a hinge pin 94 anchored to support block 91. A top roller 96 disposed within a substantially U-shaped socket 83 in cross rail 82 is adapted to horizontally move cross rail back and forth to produce the in-gag and out-gag condition of the system as heretofore indicated. A bottom in-gag roller 98 and bottom out-gag roller 99 mounted on rocker arm 92 is provided for pivotal movement of the operating rocker arm assembly 90. Mounted upon the lower die plate 12, a guide rail 101 is provided, having affixed thereto an operating block carrier 102, and a pair of movable operating block cams 103, 104 alternatively adapted to move vertically.

The rocker arm assembly 90 is shown in FIG. 10 in mid position. Under this condition gag plates 80 mounted in slots 85 would be positioned halfway in, with respect to a gag position. The rocker arm 92 is tipped back and forth to produce gag functions by positioning the operating block cams 103, 104 under the appropriate roller 98 or 99 so as the die closes and actuator 18 enters slot 48. The roller is moved upwardly to tip rocker arm 92 and moves cross rail 82 to produce either gag-in or out.

FIG. 11 illustrates the tipping mode for gag-out. Operating block carrier 102 guided on rail 101 moves operating block cam 104 under roller 99 thus tipping rocker arm 92 counterclockwise causing roller 96 to move cross rail 82 to the left against stop 88. Cross rail 82 is detented at this position and will not be moved by rapid up and down motion of the upper die plate 16. The detent 110 comprises a conventional detent ball 110, a pressure pin, spring, and adjustable retaining screw lodged within a bore 112, and is set at a position such that the detent forces it to snap seat, the seating action itself moving the cross rail 82 to produce a slight rocker arm tilt that lifts roller 99 above operating block cam 104 so that roller 99 does not strike the cam on repetitive die closures.

FIG. 12 illustrates the tipping mode for in-gag. Operating block carrier 102 moves operating block cam 103 under roller 98, tipping the rocker arm 92 clockwise causing roller 96 to move the cross rail 82 to the right against stop block 88, at which point the gag plates 80 are fully engaged with the end of slide bar 54 for in-gag.

Illustrated in FIG. 13 the positioning of operating block carrier 102 is shown. The block is guided by guide rail 101 and is moved between stops 88 and 89, by means of air cylinder 106.

Figure 14:
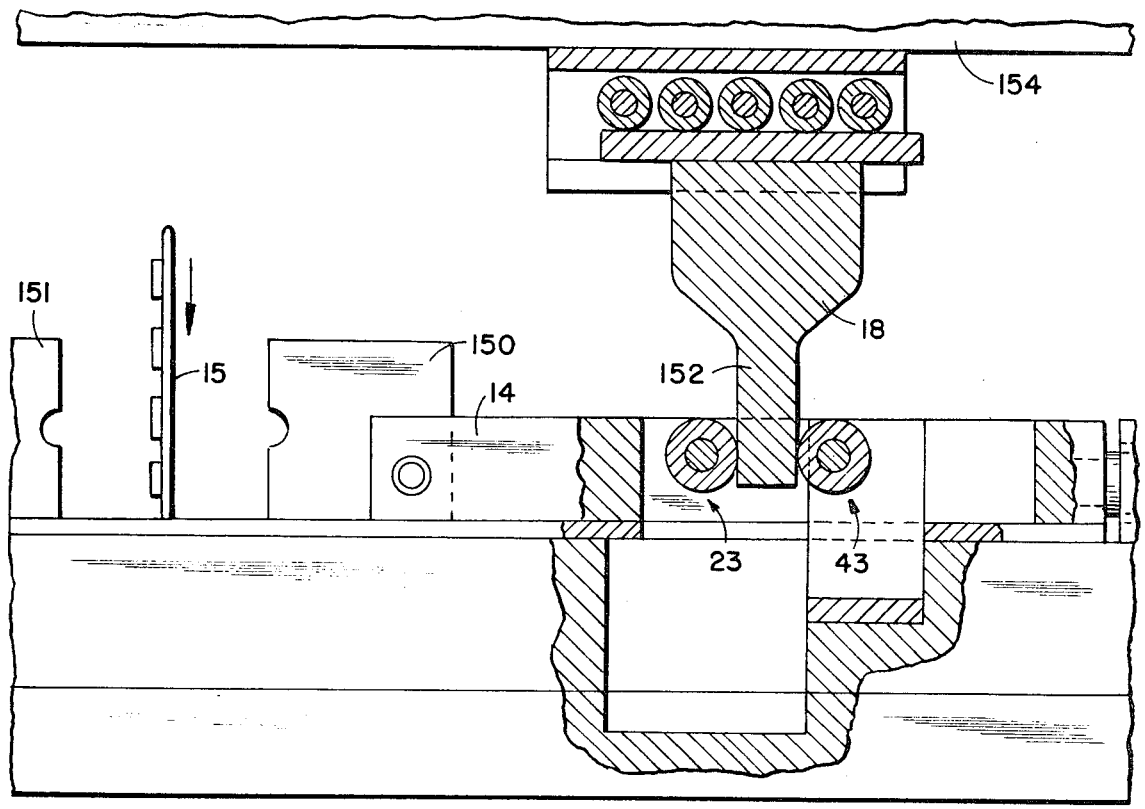
FIG. 14 illustrates the use of the long feed cam as a die and showing the die thereof in an open position.
Figure 15:
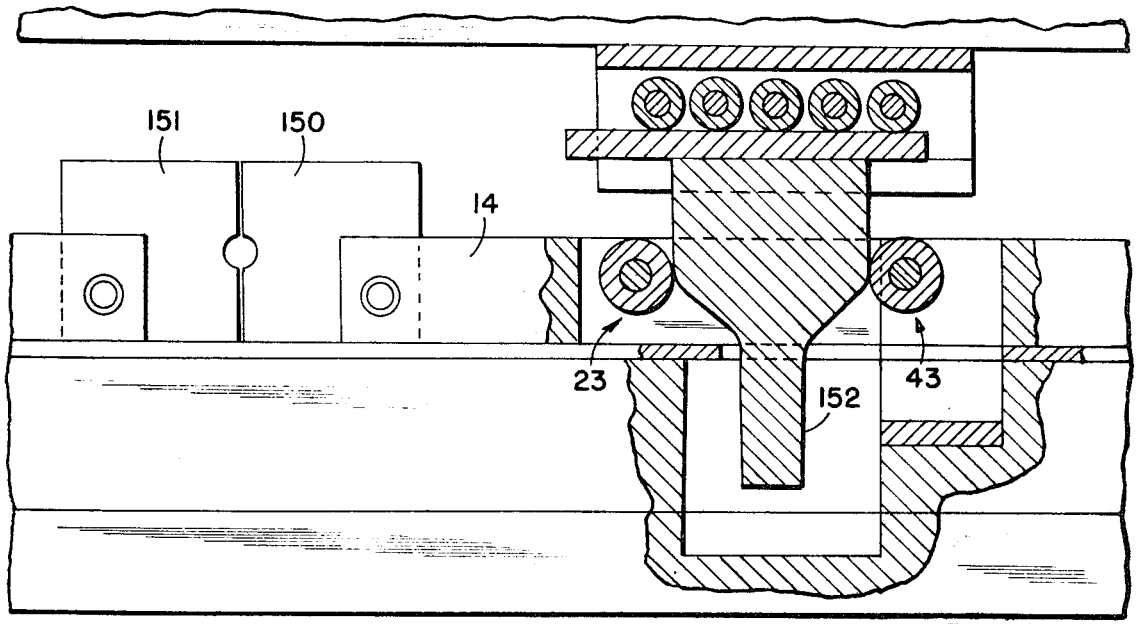
FIG. 15 is a view of the die as shown in FIG. 14, showing the die in a closed position.

In a further embodiment of the present invention the cam follower which usually carries the working tools is utilized to provide a die system. As illustrated in FIGS. 14 and 15 the actuator cam 18 and feeder bar 14 are provided with a like, opposite set of members. Feeder bar 14 is provided with one-half of a die 150 at the thereof. A similar die 151 in opposition thereto is positioned to allow a workpiece 15 to pass therebetween. Cam tail 152 on each of the cams are proportioned to provide dwell time on the down stroke and up stroke of the ram 154 so that the part to be processed may be moved simultaneously with ram movement through and positioned in the working opening for the workpiece. As the ram descends the cam followers 23 and 43 are caused to move away from the cams 18 carrying the die sections 150 and 151 on their ends toward each other as shown in FIG. 15. It is to be noted that vertical motion of the ram is translated to horizontal motion in the dies 150, 151. Although, the embodiment makes reference to two opposing half dies, one die as for example, member 150 may be utilized to be rammed against a solid block (not shown) against which a workpiece may be disposed.

I claim:

1. In combination, a die set comprising:
   a. a forming station including first die means mounted on a press;
   b. complementary, reciprocating, movable die means mounted for movement toward and away from said first die means;
   c. pull-through feeder means for progressively advancing the material to be formed through said die set;
   d. a reciprocating movable feeder bar mounted on said first die means;
   e. means for advancing a workpiece in register with said feeder bar during each reciprocating cycle of said feeder bar;
   f. feeder bar actuating means for moving said reciprocating movable feeder bar;
   g. reciprocating gag means including at least one gag plate secured to a horizontally movable cross rail and cooperating with said feeder bar actuating means to regulate the reciprocal travel of at least one movable feeder bar;
   h. said dies having provision for forming the workpiece at the forming station during each cycle of the press.

2. The invention as defined in claim 1 wherein said gag means comprise:
   a. a pair of substantially L-shaped gag plates each secured to a corresponding end of said cross rail;
   b. a support block cage for securing said cross rail therein;
   c. stop means secured to the upper die plate for limiting travel of said cross rail during its horizontal forward and rearward movement;
   d. rocker means mounted at each end of said cross rail for moving said gag plates to an in-gag and alternatively an out-gag position.

3. The invention as defined in claim 2 wherein said stop means comprise a plurality of substantially L-shaped blocks secured to the upper plate and defining the area of reciprocating travel of said cross rail.

4. The invention as defined in claim 2 wherein said rocker means comprise:
   a. a support block secured to said stop means;
   b. a rocker arm pivotally mounted to said support block;
   c. said cross rail having a substantially U-shaped socket, and a top roller mounted in said socket, said roller adapted to horizontally move said cross rail forward and rearward to produce an in-gag and out-gag condition;
   d. a bottom in-gag roller and a bottom out-gag roller mounted on said rocker arm adapted to provide a pivotal movement of said rocker arm;
   e. a guide rail secured to said movable die means;
   f. an operating block carrier mounted upon said guide rail; said operating block carrier being provided with a pair of vertically movable block cams positioned within the body of said block adapted to alternately move the bottom in-gag and bottom out-gag rollers so as to move the cross rail forwardly and rearwardly, and
   g. detent means for regulating vibratory movement of said cross rail.

* * * * *